(12) United States Patent
Rentsch et al.

(10) Patent No.: US 12,247,128 B2
(45) Date of Patent: *Mar. 11, 2025

(54) PROCESS FOR PREPARING AN AQUEOUS SUSPENSION COMPRISING A GROUND CALCIUM CARBONATE-COMPRISING MATERIAL

(71) Applicant: OMYA INTERNATIONAL AG, Oftringen (CH)

(72) Inventors: Samuel Rentsch, Spiegel bei Bern (CH); Jacques Mongoin, Quincieux (FR); Christian Jacquemet, Lyons (FR)

(73) Assignee: OMYA INTERNATIONAL AG, Oftringen (CH)

( * ) Notice: Subject to any disclaimer, the term of this patent is extended or adjusted under 35 U.S.C. 154(b) by 606 days.

This patent is subject to a terminal disclaimer.

(21) Appl. No.: 17/310,530

(22) PCT Filed: Feb. 24, 2020

(86) PCT No.: PCT/EP2020/054730
§ 371 (c)(1),
(2) Date: Aug. 7, 2021

(87) PCT Pub. No.: WO2020/173852
PCT Pub. Date: Sep. 3, 2020

(65) Prior Publication Data
US 2022/0145083 A1    May 12, 2022

(30) Foreign Application Priority Data

Feb. 26, 2019 (EP) .................... 19159417

(51) Int. Cl.
C09C 1/02 (2006.01)
C09C 3/04 (2006.01)
D21H 17/67 (2006.01)
D21H 19/12 (2006.01)

(52) U.S. Cl.
CPC .............. *C09C 1/021* (2013.01); *C09C 3/041* (2013.01); *D21H 17/675* (2013.01); *D21H 19/12* (2013.01); *C01P 2004/62* (2013.01)

(58) Field of Classification Search
CPC .............. C01P 2004/62; C01P 2004/82; C01P 2006/12; C09C 1/021; C09C 3/041; D21H 17/00; D21H 17/675; D21H 19/00; D21H 19/12
See application file for complete search history.

(56) References Cited

U.S. PATENT DOCUMENTS

| 5,278,248 A | 1/1994 | Egraz et al. |
| 10,767,055 B2 | 9/2020 | Blanchard et al. |
| 2004/0019148 A1 | 1/2004 | Suau et al. |
| 2004/0097616 A1 | 5/2004 | Hoppler et al. |
| 2004/0250970 A1 | 12/2004 | Qiu et al. |
| 2007/0167531 A1 | 7/2007 | Preston et al. |
| 2009/0298988 A1* | 12/2009 | Jacquemet ............ B02C 23/06 524/425 |
| 2010/0025507 A1 | 2/2010 | Buri |
| 2010/0258034 A1 | 10/2010 | Reisacher et al. |
| 2011/0092629 A1* | 4/2011 | Mongoin ............ C01F 11/185 524/425 |
| 2012/0225988 A1 | 9/2012 | Suau et al. |
| 2013/0197142 A1 | 8/2013 | Buri et al. |
| 2017/0009076 A1 | 1/2017 | Rentsch et al. |
| 2022/0145083 A1 | 5/2022 | Rentsch et al. |

FOREIGN PATENT DOCUMENTS

| EP | 2194103 A1 | 6/2010 |
| EP | 2199348 A1 | 6/2010 |
| EP | 2371766 A1 | 10/2011 |
| EP | 2390285 A1 | 11/2011 |
| EP | 2447213 A1 | 5/2012 |
| EP | 2524898 A1 | 11/2012 |
| EP | 2770017 A1 | 8/2014 |
| EP | 2910609 A1 | 8/2015 |
| EP | 3042878 A1 | 7/2016 |
| WO | 00/20336 A1 | 4/2000 |
| WO | 02/055596 A1 | 7/2002 |

(Continued)

OTHER PUBLICATIONS

International Search Report from PCT/EP2020/054730, mailed Mar. 13, 2020, 4 pages.
Written Opinion from PCT/EP2020/054730, mailed Mar. 13, 2020, 6 pages.
International Search Report from PCT/EP2020/054728, mailed Mar. 13, 2020, 5 pages.
Written Opinion from PCT/EP2020/054728, mailed Mar. 13, 2020, 6 pages.
Restriction Requirement in U.S. Appl. No. 17/310,240 dated Feb. 28, 2024, 8 pages.
Response to Restriction Requirement in U.S. Appl. No. 17/310,240 dated Apr. 15, 2024, 4 pages.

(Continued)

*Primary Examiner* — Shuangyi Abu Ali
(74) *Attorney, Agent, or Firm* — ALGM LLP; Harry J. Guttman

(57) ABSTRACT

The present invention relates to a process for preparing an aqueous suspension comprising a ground calcium carbonate-comprising material, the use of a homopolymer or a copolymer in such a process for preparing an aqueous suspension comprising a ground calcium carbonate-comprising material, an aqueous suspension comprising a ground calcium carbonate-comprising material obtained by the process, and the use of an aqueous suspension comprising a ground calcium carbonate-comprising material in paper applications such as paper filling and paper coating applications, in coating applications, in paints, in adhesives, in sealants, in concrete, in agriculture applications, in food applications, in cosmetic applications, or in pharmaceutical applications.

20 Claims, No Drawings

(56) References Cited

FOREIGN PATENT DOCUMENTS

| WO | 03/066692 A1 | 8/2003 |
| WO | 2005/075353 A1 | 8/2005 |
| WO | 2010/030579 A1 | 3/2010 |
| WO | 2016/023937 A1 | 2/2016 |

OTHER PUBLICATIONS

NonFinal Office action in U.S. Appl. No. 17/310,240 dated Jun. 6, 2024, 14 pages.
Response to NonFinal Office action in U.S. Appl. No. 17/310,240 dated Aug. 21, 2024, 14 pages.
Final Office action in U.S. Appl. No. 17/310,240 dated Sep. 10, 2024, 15 pages.
International Search Report from PCT/EP2020/054724, mailed Mar. 26, 2020, 4 pages.
Written Opinion from PCT/EP2020/054724, mailed Mar. 26, 2020, 15 pages.
Restriction Requirement in U.S. Appl. No. 17/310,501, dated Mar. 14, 2024, 8 pages.
Response to Restriction Requirement in U.S. Appl. No. 17/310,501, dated May 2, 2024, 4 pages.
NonFinal Office action in U.S. Appl. No. 17/310,501, dated Aug. 12, 2024, 17 pages.
Response to Final Office action in U.S. Appl. No. 17/310,240 dated Nov. 27, 2024, 13 pages.

\* cited by examiner

PROCESS FOR PREPARING AN AQUEOUS SUSPENSION COMPRISING A GROUND CALCIUM CARBONATE-COMPRISING MATERIAL

CROSS-REFERENCE TO RELATED APPLICATIONS

This application is a National Stage Entry of International Application No. PCT/EP2020/054730 filed Feb. 24, 2020, entitled "PROCESS FOR PREPARING AN AQUEOUS SUSPENSION COMPRISING A GROUND CALCIUM CARBONATE-COMPRISING MATERIAL", and which claims priority to EP application Ser. No. 19/159,417.5 filed Feb. 26, 2019 entitled "PROCESS FOR PREPARING AN AQUEOUS SUSPENSION COMPRISING A GROUND CALCIUM CARBONATE-COMPRISING MATERIAL."

The present invention relates to a process for preparing an aqueous suspension comprising a ground calcium carbonate-comprising material, the use of a grinding aid homopolymer or a copolymer in such a process for preparing an aqueous suspension comprising a ground calcium carbonate-comprising material, an aqueous suspension comprising a ground calcium carbonate-comprising material obtained by the process, and the use of an aqueous suspension comprising a ground calcium carbonate-comprising material in paper applications such as paper filling and paper coating applications, in coating applications, in paints, in adhesives, in sealants, in concrete, in agriculture applications, in food applications, in cosmetic applications, or in pharmaceutical applications.

In practice, aqueous preparations and especially suspensions of water-insoluble solids such as calcium carbonate-comprising materials are used extensively in the paper, paint, rubber industries as coatings, fillers, extenders and pigments for papermaking as well as aqueous paints, adhesives and sealants, but also in concrete, for agriculture applications, food applications, cosmetic applications, or pharmaceutical applications. Said water-insoluble solids are frequently selected from natural or synthetic calcium carbonates or dolomites. For example, suspensions or slurries of said water-insoluble solids are used in the paper industry in large amounts as filler and/or as a component in the preparation of coated paper.

Typical aqueous suspensions of water-insoluble solids are characterized in that they comprise water, a water-insoluble solid compound and optionally further additives, such as dispersing agents, in the form of a suspension or slurry. Such dispersing agents typically allow for wet grinding and are, for example, described in U.S. Pat. No. 5,278,248.

US2004019148 A1 relates to the use of a slightly anionic and water-soluble copolymer, as a dispersing agent and/or an agent for assisting the grinding of pigments and/or mineral fillers in aqueous suspension giving on the one hand a low Zeta potential to the aqueous suspensions of the said fillers and/or pigments and on the other hand affording an electrosteric stabilization of the said suspensions.

However, it is desirable to provide aqueous suspensions of ground calcium carbonate-comprising materials having high solids content. In this regard, one drawback of high solids aqueous suspensions comprising a dispersant of the prior art is that such suspensions usually have a high viscosity, which impedes an efficient pumping and an exact dosage of the aqueous suspension. Furthermore, a high viscosity often precludes wet grinding of the aqueous suspensions. Therefore, the calcium carbonate-comprising material is often wet ground in an aqueous suspension having a lower solids content, which is less energy-efficient. After said wet grinding step at lower solids content, the aqueous suspension has to be up-concentrated for further transport or use, which is an equally energetically unfavourable process.

In view of the above, there is still a need in the art for a process to prepare an aqueous suspension comprising a ground calcium carbonate-comprising material in a solids content of at least 70 wt.-% by using a grinding aid agent imparting a workable viscosity, that is to say a Brookfield viscosity that is lower than that of the same suspension prepared by a process using a grinding aid agent of the prior art. It is further desired to prepare an aqueous suspension comprising a ground calcium carbonate-comprising material in a solids content of at least 70 wt.-%, enabling the application of said aqueous solution in paper applications such as paper filling and paper coating applications, in coating applications, in paints, in adhesives, in sealants, in concrete, in agriculture applications, in food applications, in cosmetic applications, or in pharmaceutical applications.

Thus, there is still a need for providing a process which addresses the foregoing technical problems described and especially allows for reducing the energy consumption in a wet grinding process and imparting a workable viscosity to an aqueous suspension comprising a ground calcium carbonate-comprising material in a solids content of at least 70 wt.-% such that the transporting and application of said aqueous suspensions are facilitated. Further objectives can be gathered from the following description of the invention.

The foregoing and other objectives are solved by the subject-matter as defined herein in claim 1.

Advantageous embodiments of the inventive process are defined in the corresponding dependent claims.

According to one aspect of the present application, a process for preparing an aqueous suspension comprising a ground calcium carbonate-comprising material is provided. The process comprises the steps of:
a) providing water,
b) providing at least one calcium carbonate-comprising material,
c) providing at least one grinding aid polymer selected from the group consisting of
   a homopolymer (P1) prepared from the polymerisation reaction of acrylic acid or methacrylic acid or salts thereof, the homopolymer (P1) having
      an average molecular weight ($M_w$) as measured by gel permeation chromatography (GPC) from 3 000 to 5 000 g/mol, and
      a polydispersity index (PI) from 1.5 to 2.9 as measured by gel permeation chromatography (GPC), and
      carboxylic acid functions that are totally or partially neutralized
         by $Na^+$ in an amount of 70 mol-% and
         by $Na^+$, $K^+$, $Li^+$ or combinations thereof in an additional amount from 10 to 30 mol-%;
   a copolymer (P2) prepared from the polymerisation reaction of
      at least one compound selected from acrylic acid, methacrylic acid, salts thereof and combinations thereof, and
      at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof;

the copolymer (P2) having
an average molecular weight ($M_w$) as measured by gel permeation chromatography (GPC) from 4 000 to 20 000 g/mol, and
a polydispersity index (PI) from 1.5 to 4.0 as measured by gel permeation chromatography (GPC), and carboxylic acid functions that are totally or partially neutralized
by $Na^+$ in an amount of 70 mol-% and
by $Na^+$, $K^+$, $Li^+$ or combinations thereof in an additional amount from 10 to 30 mol-%;
and mixtures thereof,
d) forming an aqueous suspension by mixing the water of step a), the at least one calcium carbonate-comprising material of step b) and the at least one polymer of step c);
e) wet grinding the at least one calcium carbonate-comprising material in the aqueous suspension of step d) in the presence of the at least one polymer in at least one wet grinding step to obtain a ground calcium carbonate-comprising material, and
f) up-concentrating or partially dewatering the aqueous suspension comprising the ground calcium carbonate-comprising material obtained in step e) to achieve a higher solids content greater than that of step e) and the solids content achieved in step f is at least 70 wt.-%, based on the total weight of the suspension.

According to one embodiment, the aqueous suspension obtained in step f) has a higher solids content than that of step e) and the solids content achieved in step f) is from 70 to 80 wt.-%, preferably from 74 to 80 wt.-%, more preferably from 76 to 80 wt.-%, even more preferably from 78 to 80 wt.-%. According to another embodiment, the at least one calcium carbonate-comprising material in the aqueous suspension obtained in step e) and/or f) has a weight median particle size $d_{50}$ (determined by the sedimentation method) from 0.1 to 3.0 µm, preferably from 0.1 to 2.8 µm, more preferably from 0.4 to 2.6 µm, and still more preferably from 0.6 to 2.5 µm.

According to yet another embodiment, the aqueous suspension of step d) and/or e) has a solids content from 40 to 74 wt.-%, preferably from 50 to 74 wt.-%, more preferably from 50 to 70 wt.-% based on the total weight of the aqueous suspension.

According to one embodiment, the carboxylic acid functions of the homopolymer (P1) or the carboxylic acid functions of the copolymer (P2) are
totally neutralized; or
neutralized in an amount of at least 85 mol-%, preferably neutralized in an amount of at least 90 mol-%; or
solely neutralized by $Na^+$, preferably neutralized by $Na^+$ in an amount of at least 85 mol-%, more preferably neutralized by $Na^+$ in an amount of at least 90 mol-%, still more preferably neutralized by $Na^+$ in an amount of 100 mol-%.

According to another embodiment, the homopolymer (P1) has an average molecular weight ($M_w$) as measured by gel permeation chromatography (GPC) from 3 100 to 4 900 g/mol, preferably from 3 200 to 4 800 g/mol; or the copolymer (P2) has an average molecular weight ($M_w$) as measured by gel permeation chromatography (GPC) from 4 000 to 18 000 g/mol, preferably from 10 000 to 16 000 g/mol.

According to yet another embodiment, the at least one grinding aid polymer is present in the aqueous suspension during wet grinding step e) in an amount ranging from 0.05 to 0.5 wt.-%, preferably from 0.08 to 0.4 wt.-%, more preferably from 0.1 to 0.3 wt.-%, even more preferably from 0.12 to 0.2 wt.-%, based on the total dry weight of the calcium carbonate-comprising material.

According to one embodiment, process step f) is carried out by mechanical up-concentration, by thermal up-concentration or by combining mechanical and thermal up-concentration, optionally in combination with vacuum.

According to another aspect of the present application, the use of a homopolymer (P1) and/or a copolymer (P2) in a process as defined herein is provided, wherein
the homopolymer (P1) is prepared from the polymerisation reaction of acrylic acid or methacrylic acid or salts thereof, the homopolymer (P1) having
an average molecular weight ($M_w$) as measured by gel permeation chromatography (GPC) from 3 000 to 5 000 g/mol, and
a polydispersity index (PI) from 1.5 to 2.9 as measured by gel permeation chromatography (GPC), and
carboxylic acid functions that are totally or partially neutralized
by $Na^+$ in an amount of 70 mol-% and
by $Na^+$, $K^+$, $Li^+$ or combinations thereof in an additional amount from 10 to 30 wt.-%; and/or
the copolymer (P2) is prepared from the polymerisation reaction of
at least one compound selected from acrylic acid, methacrylic acid, salts thereof and combinations thereof, and
at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof;
the copolymer (P2) having
an average molecular weight ($M_w$) as measured by gel permeation chromatography (GPC) from 4 000 to 20 000 g/mol, and
a polydispersity index (PI) from 1.5 to 4.0 as measured by gel permeation chromatography (GPC), and
carboxylic acid functions that are totally or partially neutralized
by $Na^+$ in an amount of 70 mol-% and
by $Na^+$, $K^+$, $Li^+$ or combinations thereof in an additional amount from 10 to 30 mol-%.

According to still another aspect of the present application, an aqueous suspension comprising a ground calcium carbonate-comprising material in a solids content of at least 70 wt.-%, based on the total weight of the suspension, obtained by a process as defined herein is provided.

According to yet another aspect of the present application, an aqueous suspension is provided, the suspension comprising water, a ground calcium carbonate-comprising material in a solids content of at least 70 wt.-%, based on the total weight of the suspension, and at least one grinding aid polymer selected from the group consisting of
a homopolymer (P1) prepared from the polymerisation reaction of acrylic acid or methacrylic acid or salts thereof, the homopolymer (P1) having
an average molecular weight ($M_w$) as measured by gel permeation chromatography (GPC) from 3 000 to 5 000 g/mol, and
a polydispersity index (PI) from 1.5 to 2.9 as measured by gel permeation chromatography (GPC), and carboxylic acid functions that are totally or partially neutralized
by Na⁺ in an amount of 70 mol-% and
by Na⁺, K⁺, Li⁺ or combinations thereof in an additional amount of from 10 to 30 mol-%;
a copolymer (P2) prepared from the polymerisation reaction of
at least one compound selected from acrylic acid, methacrylic acid, salts thereof and combinations thereof, and
at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof;
the copolymer (P2) having
an average molecular weight ($M_W$) as measured by gel permeation chromatography (GPC) from 4 000 to 20 000 g/mol, and
a polydispersity index (PI) from 1.5 to 4.0 as measured by gel permeation chromatography (GPC), and
carboxylic acid functions that are totally or partially neutralized
by Na⁺ in an amount of 70 mol-%, and
by Na⁺, K⁺, Li⁺ or combinations thereof in an additional amount of from 10 to 30 mol-%;
and mixtures thereof.

According to a further aspect of the present application, the use of the aqueous suspension obtained by a process as defined herein or the aqueous suspension as defined herein in paper applications such as paper filling and paper coating applications, in coating applications, in paints, in adhesives, in sealants, in concrete, in agriculture applications, in food applications, in cosmetic applications, or in pharmaceutical applications is provided.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

In the following details and preferred embodiments of the inventive process will be set out in more details. It is to be understood that these technical details and embodiments also apply to the inventive products as well as to their use.

Process Step a)

According to process step a) of the present invention, water is provided.

For the purpose of the present invention, any type of water can be used in order to form the aqueous suspension in step d).

According to one embodiment the water is tap water, deionized water, process water or a mixture thereof. Preferably, the water provided in step a) is tap water.

Process Step b)

According to step b) of the process of the present invention, at least one calcium carbonate-comprising material is provided.

The expression "at least one" calcium carbonate-comprising material means that one or more, for example two or three, calcium carbonate-comprising material(s) may be provided. According to a preferred embodiment, only one calcium carbonate-comprising material is provided in step b).

In general, said at least one calcium carbonate-comprising material can be any calcium carbonate source and can be of natural or synthetic origin.

In some embodiments of the process according to the present invention, the at least one calcium carbonate-comprising material provided in step b) is selected from natural calcium carbonate sources, preferably containing from 80 to 100 wt.-% of calcium carbonate, based on the total weight of said calcium carbonate-comprising material.

According to another embodiment, the at least one calcium carbonate-comprising material provided in step b) is selected from the group consisting of marble, limestone, chalk, dolomite, and mixtures thereof.

Preferably, the at least one calcium carbonate-comprising material provided in step b) is selected from the group consisting of marble, limestone, chalk, and mixtures thereof.

In one embodiment, the at least one calcium carbonate-comprising material provided in step b) is marble.

In cases where the at least one calcium carbonate-comprising material is of synthetic origin, the calcium carbonate-comprising material can be precipitated calcium carbonate (PCC). A PCC in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate, for example, in an aqueous environment. PCC may be vaterite, calcite or aragonite. PCCs are described, for example, in EP2447213, EP2524898, or EP2371766.

Suitably, the at least one calcium carbonate-comprising material of step b) is provided as a solid material being in particulate form. In this respect, the at least one calcium carbonate-comprising material provided in step b) can have any particle size distribution allowing the material to be subjected to a wet grinding step. Therefore, the at least one calcium carbonate-comprising material can be provided as a comminuted material, for example, in crushed or preground form.

For example, the calcium carbonate-comprising material of step b) has been processed through a crushing, wet and/or dry grinding, screening and/or fractionating, for example by a cyclone or classifier. In one embodiment, the calcium carbonate-comprising material of step b) has been processed through a crushing, grinding, screening and fractionating, for example by a cyclone or classifier.

It is to be noted that a crushing stage is distinguished from a grinding stage in that crushing is an essentially coarse combination, generally leading to fragments being obtained with an average diameter of the order of one centimeter, or one millimeter, whereas grinding consists of a fragmentation operation leading to a substantially finer product than the crushed product, of an average diameter of 0.5 to 600 microns.

In one embodiment, the calcium carbonate-comprising material of step b) has been obtained by dry grinding. According to another embodiment of the present invention, the calcium carbonate-comprising material of step b) has obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate-comprising material of step b) comprises wet ground calcium carbonate-comprising particles, the grinding step may be performed under conditions such that autogenous grinding takes place and/or by horizontal ball milling, and/or other such processes known to the skilled man. The wet processed calcium carbonate-comprising material thus obtained may be washed and dewatered by well known processes, e.g. by flocculation, filtration or forced evaporation prior to drying. The subsequent step of drying may be carried out in a single step such as spray drying, or in at least two steps. It is also common that such calcium carbonate-comprising material undergo a beneficiation step (such as a flotation, bleaching or magnetic separation step) to remove impurities. Such processes for processing calcium carbonate-comprising materials for adjusting and obtaining specific particle sizes are well known to the skilled person, e.g. from US2010025507 A1.

According to one embodiment, the at least one calcium carbonate-comprising material provided in step b) has a weight median particle size $d_{50}$ ranging from 0.5 to 600 μm, preferably from 0.8 to 200 μm, and more preferably from 1 to 100 μm.

Additionally or alternatively, the at least one calcium carbonate-comprising material provided in step b) has a particle size $d_{90}$ ranging from 5 to 1 000 μm, preferably from 10 to 500 μm, and more preferably from 20 to 200 μm.

Additionally or alternatively, the at least one calcium carbonate-comprising material provided in step b) has a particle size $d_{20}$ ranging from 0.1 to 200 μm, preferably from 0.4 to 100 μm, and more preferably from 0.8 to 50 μm.

Thus, the at least one calcium carbonate-comprising material provided in step b) preferably has a) a particle size $d_{50}$ ranging from 5 to 1 000 μm, preferably from 10 to 500 μm, and more preferably from 20 to 200 μm, and b) a weight median particle size $d_{50}$ ranging from 0.5 to 600 μm, preferably from 0.8 to 200 μm, and more preferably from 1 to 100 μm.

Alternatively, the at least one calcium carbonate-comprising material provided in step b) has a) a weight median particle size $d_{50}$ ranging from 0.5 to 600 μm, preferably from 0.8 to 200 μm, and more preferably from 1 to 100 μm, and b) a particle size $d_{20}$ ranging from 0.1 to 200 μm, preferably from 0.4 to 100 μm, and more preferably from 0.8 to 50 μm.

In one embodiment, the at least one calcium carbonate-comprising material provided in step b) has a) a particle size $d_{90}$ ranging from 5 to 1 000 μm, preferably from 10 to 500 μm, and more preferably from 20 to 200 μm, and b) a weight median particle size $d_{50}$ ranging from 0.5 to 600 μm, preferably from 0.8 to 200 μm, and more preferably from 1 to 100 μm, and c) a particle size $d_{20}$ ranging from 0.1 to 200 μm, preferably from 0.4 to 100 μm, and more preferably from 0.8 to 50 μm.

The "particle size" of particulate materials, for example the calcium carbonate-comprising material herein, is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all grains are bigger and the remaining 50 wt.-% are smaller than this particle size. The $d_{90}$ value is the particle size at which 90 wt.-% of all particles are smaller than that particle size. For the purpose of the present invention the particle size is specified as weight median particle size $d_{50}$ unless indicated otherwise. The $d_{98}$ value is the particle size at which 98 wt.-% of all particles are smaller than that particle size. The $d_{98}$ value is also designated as "top cut". Particle sizes were determined by using a Sedigraph™5100 or 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$. The samples were dispersed using a high speed stirrer and sonicated.

Process Step c)

According to step c) of the process of the present invention, at least one grinding aid polymer is provided. The at least one grinding aid polymer is selected from the group consisting of a homopolymer (P1) prepared from the polymerisation reaction of acrylic acid or methacrylic acid or salts thereof, a copolymer (P2) prepared from the polymerisation reaction of acrylic acid or methacrylic acid or salts thereof and at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof is provided.

The inventors surprisingly found out that it is of particular advantage that the at least one grinding aid polymer is selected from the group consisting of a homopolymer (P1), a copolymer (P2) and mixtures thereof.

It is appreciated that the homopolymer (P1) is prepared from the polymerisation reaction of acrylic acid or methacrylic acid or salts thereof, i.e. the salts of acrylic acid or methacrylic acid, and the homopolymer (P1) has i) an average molecular weight ($M_w$) as measured by gel permeation chromatography (GPC) from 3 000 to 5 000 g/mol, and ii) a polydispersity Index (PI) as measured by gel permeation chromatography (GPC) of between 1.5 and 2.9, and iii) carboxylic acid functions that are totally or partially neutralized by $Na^+$ in an amount of 70 mol-% and by $Na^+$, $K^+$, $Li^+$ or combinations thereof in an additional amount from 10 to 30 mol-%, It is appreciated that the copolymer (P2) is prepared from the polymerisation reaction of at least one compound selected from acrylic acid, methacrylic acid, salts thereof, i.e. the salts of acrylic acid or methacrylic acid, and combinations thereof, and at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, salts thereof, and combinations thereof, the copolymer (P2) has i) a molecular weight ($M_W$) as measured by gel permeation chromatography (GPC) from 4 000 to 20 000 g/mol, and ii) a polydispersity Index (PI) as measured by gel permeation chromatography (GPC) of between 1.5 and 4.0, and iii) carboxylic acid functions that are totally or partially neutralized by $Na^+$ in an amount of 70 mol-% and by $Na^+$, $K^+$, $Li^+$ or combinations thereof in an additional amount from 10 to 30 mol-%.

The use of such a homopolymer (P1) and/or copolymer (P2) in a process for preparing an aqueous suspension comprising a ground calcium carbonate-comprising material in a solids content of at least 70 wt.-%, based on the total weight of the suspension, provides a desirable viscosity for use in a variety of further processing steps and applications.

It is appreciated that the expression "at least one" grinding aid polymer means that the polymer comprises, preferably consists of, one or more kinds of polymers, i.e. one or more kinds of homopolymer(s) (P1), and/or one or more kinds of copolymer(s) (P2).

Accordingly, it should be noted that the homopolymer (P1) may be one kind of homopolymer (P1). Alternatively, the homopolymer (P1) may be a mixture of two or more kinds of homopolymers (P1). For example, the homopolymer (P1) may be a mixture of two or three kinds of homopolymers (P1), like two kinds of homopolymers (P1). Preferably, the homopolymer (P1) is one kind of homopolymer (P1).

Further, the copolymer (P2) may be one kind of copolymer (P2). Alternatively, the copolymer (P2) may be a mixture of two or more kinds of copolymers (P2). For example, the copolymer (P2) may be a mixture of two or three kinds of copolymers (P2), like two kinds of copolymers (P2). Preferably, the copolymer (P2) is one kind of copolymer (P2).

In one embodiment, a mixture of the homopolymer (P1), i.e. one or more homopolymer(s) (P1), and the copolymer (P2), i.e. one or more copolymer(s) (P2), may be provided in process step c). It should be understood that the term "mixture" also encompasses that the homopolymer (P1) and the copolymer (P2) are provided separately, and are admixed separately in the process step d), as described herein below.

In one embodiment of the present invention, the at least one grinding aid polymer comprises, preferably consists of, one kind of homopolymer (P1) or one kind of copolymer (P2). Alternatively, the at least one polymer is a mixture comprising, preferably consisting of, one kind of homopolymer (P1) and one kind of copolymer (P2).

It is one requirement of the present invention that the homopolymer (P1) is obtained from the polymerisation reaction of acrylic acid or methacrylic acid or salts thereof, i.e. the salts of acrylic acid or methacrylic acid.

Preferably, the homopolymer (P1) is obtained from the polymerisation reaction of acrylic acid or salts thereof.

It has been found out that the advantageous results are especially achieved if the homopolymer (P1) prepared from the polymerisation reaction of acrylic acid or methacrylic acid or salts thereof is a homopolymer wherein the carboxylic acid functions are totally or partially neutralized.

More precisely, it has been found out that the carboxylic acid functions of the homopolymer must be totally or partially neutralized by $Na^+$ in an amount of 70 mol-% and by $Na^+$, $K^+$, $Li^+$ or combinations thereof in an additional amount from 10 to 30 mol-%.

It is appreciated that such homopolymers (P1) prepared from the polymerisation reaction of acrylic acid or methacrylic acid or salts thereof may be prepared by any process known to the skilled person. That is to say, the homopolymer (P1) can be prepared from the polymerisation reaction of acrylic acid or methacrylic acid and the subsequent partial or full neutralization of the carboxylic acid functions by $Na^+$ in an amount of 70 mol-% and by $Na^+$, $K^+$, $Li^+$ or combinations thereof in an additional amount from 10 to 30 mol-%. Alternatively, the homopolymer (P1) is prepared from the polymerisation reaction of the corresponding salt(s) of acrylic acid or methacrylic acid resulting in a homopolymer (P1) featuring a partial or full neutralization of the carboxylic acid functions by $Na^+$ in an amount of 70 mol-% and by $Na^+$, $K^+$, $Li^+$ or combinations thereof in an additional amount from 10 to 30 wt.-%.

Unless indicated otherwise, the term "partially neutralized" as used herein indicates that the homopolymer (P1) still contains unneutralized carboxylic acid functions, i.e. free carboxylic acid functions are present. In contrast thereto, the term "totally neutralized" indicates that any carboxylic acid function present in the homopolymer (P1) is neutralized, i.e. no free carboxylic acid functions are present. The methods of partially or totally replacing protons of carboxylic acid functions by monovalent cations are well known as well as the methods to determine whether a polymer is partially or totally neutralized.

Accordingly, the carboxylic acid functions are totally or partially neutralized by $Na^+$ in an amount of 70 mol-% and by $Na^+$, $K^+$, $Li^+$ or combinations thereof in an additional amount from 10 to 30 wt.-%. If not otherwise indicated the amount of $Na^+$ and optionally $K^+$ and/or $Li^+$ is based on the total amount of carboxylic acid functions in the homopolymer (P1).

In one embodiment, the carboxylic acid functions of the homopolymer (P1) are totally or partially neutralized in an amount of at least 85 mol-%, preferably in an amount of at least 90 mol-%.

In one embodiment, the carboxylic acid functions of the homopolymer (P1) are totally neutralized, i.e. the carboxylic acid functions of the homopolymer (P1) are neutralized in an amount of 100 mol-%. In this embodiment, the homopolymer (P1) does not contain free carboxylic acid functions.

In one embodiment, the carboxylic acid functions of the homopolymer (P1) are totally or partially neutralized by $Na^+$ only. That is to say, the carboxylic acid functions are totally or partially neutralized by $Na^+$ in an amount of at least 85 mol-%, i.e. from 85 to 100 mol-%, more preferably at least 90 mol-%, i.e. from 90 to 100 mol-%, still more preferably 100 mol-%.

For example, the carboxylic acid functions of the homopolymer (P1) are partially neutralized by $Na^+$ in an amount from 85 to 95 mol-%. In this embodiment, the homopolymer (P1) thus contains free carboxylic acid functions in an amount from 5 to 15 mol-%. Preferably, the carboxylic acid functions of the homopolymer (P1) are partially neutralized by $Na^+$ in an amount from 88 to 92 mol-%, i.e. the homopolymer (P1) contains free carboxylic acid functions in an amount from 8 to 12 mol-%. Preferably, 100% of the neutralized carboxylic acid functions of the homopolymer (P1) of step c) are neutralized by $Na^+$.

Additionally, it has been found out that the average molecular weight (Mw) of the homopolymer (P1) prepared from the polymerisation reaction of acrylic acid or methacrylic acid or salts thereof must be in a very specific range. Most advantageously, the homopolymer (P1) has an average molecular weight (Mw) as measured by gel permeation chromatography (GPC) from 3 000 to 5 000 g/mol.

According to one embodiment, the homopolymer (P1) provided in step c) has an average molecular weight (Mw) as measured by gel permeation chromatography (GPC) of from 3 100 to 4 900 g/mol, preferably from 3 200 to 4 800 g/mol, more preferably from 3 200 to 4 700 g/mol, and most preferably from 3 300 to 4 700 g/mol.

Additionally, it is required that the polydispersity Index (PI) of the at least one homopolymer (P1) must be in a very specific range. Most advantageously, the homopolymer (P1) has a polydispersity Index (PI) as measured by gel permeation chromatography (GPC) of between 1.5 and 2.9.

Preferably, the homopolymer (P1) provided in step c) has a polydispersity Index (PI) as measured by gel permeation chromatography ((GPC) of between 1.5 and 2.8, preferably between 1.6 and 2.7, more preferably between 1.7 and 2.5, and most preferably between 1.8 and 2.3.

In one embodiment, the homopolymer (P1) provided in step c) is thus a homopolymer, wherein 100% of the neutralized carboxylic acid functions of the homopolymer are neutralized by $Na^+$ and having
  i) an average molecular weight (Mw) as measured by gel permeation chromatography (GPC) from 3 000 to 5 000 g/mol, preferably from 3 100 to 4 900 g/mol, more preferably from 3 200 to 4 800 g/mol, even more preferably from 3 200 to 4 700 g/mol, and most preferably from 3 300 to 4 700 g/mol, and
  ii) a polydispersity Index (PI) as measured by gel permeation chromatography (GPC) of between 1.5 and 2.9, preferably between 1.5 and 2.8, more preferably between 1.6 and 2.7, even more preferably between 1.7 and 2.5, and most preferably between 1.8 and 2.3.

Additionally or alternatively, the at least one grinding aid polymer is a copolymer (P2). It is appreciated that the copolymer (P2) is obtained from the polymerisation reaction of
  at least one compound selected from acrylic acid, methacrylic acid, salts thereof, and combinations thereof, and
  at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof.

For example, the copolymer (P2) is obtained from the polymerisation reaction of
  acrylic acid or salts thereof, and
  at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof.

Preferably, the copolymer (P2) is obtained from the polymerisation reaction of
  acrylic acid or salts thereof, and
  hydroxyethylacrylate, hydroxypropylacrylate or $C_1$-$C_5$ esters of acrylic acid.

It is appreciated that the $C_1$-$C_5$ ester of acrylic acid and/or $C_1$-$C_5$ ester of methacrylic acid is/are preferably selected from alkyl esters of acrylic acid and/or alkyl esters of methacrylic acid. For example, the $C_1$-$C_5$ ester of acrylic acid is selected from alkyl esters of acrylic acid.

Preferably, the $C_1$-$C_5$ ester of acrylic acid is selected from the group consisting of methyl, ethyl, propyl, butyl, pentyl acrylate. More preferably, the $C_1$-$C_5$ ester of acrylic acid is selected from the group comprising methyl and ethyl acrylate.

Most preferably, the ester of acrylic acid is hydroxypropyl acrylate.

Additionally or alternatively, the $C_1$-$C_5$ ester of methacrylic acid may be selected from alkyl esters of methacrylic acid. For example, the $C_1$-$C_5$ ester of methacrylic acid is selected from the group consisting of methyl, ethyl, propyl, butyl, pentyl methacrylate. More preferably, the $C_1$-$C_5$ ester of methacrylic acid is selected from the group comprising methyl and ethyl methacrylate.

Most preferably, the ester of methacrylic acid is hydroxypropyl methacrylate.

In a preferred embodiment, the copolymer (P2) is obtained from the polymerisation reaction of
  acrylic acid or salts thereof, and
  hydroxypropylacrylate.

In one embodiment of the present invention, the monomer units derivable from the at least one compound selected from acrylic acid, methacrylic acid, salts thereof, and combinations thereof, constitutes the main part of the copolymer (P2), i.e. at least 60 wt.-%, preferably at least 70 wt.-%, more preferably at least 80 wt.-%, still more preferably from 60 to 99 wt.-%, yet more preferably from 70 to 99 wt.-% and most preferably from 80 to 99 wt.-%, based on the total weight of the copolymer (P2). The amount of monomer units derived from the at least one non-ionic compound selected from esters of acrylic acid, esters of methacrylic acid, salts thereof, and combinations thereof in the copolymer (P2), is in the range of 1 to 40 wt.-%, more preferably in the range of 1 to 30 wt.-% and most preferably in the range of 1 to 20 wt.-%, based on the total weight of the copolymer (P2).

It has been further found out that the advantageous results are especially achieved if the copolymer (P2) is a copolymer wherein the carboxylic acid functions are totally or partially neutralized.

More precisely, it has been found out that the carboxylic acid functions of the copolymer (P2) must be totally or partially neutralized by $Na^+$ in an amount of 70 mol-% and by $Na^+$, $K^+$, $Li^+$ or combinations thereof in an additional amount from 10 to 30 mol-%.

It is appreciated that such copolymers (P2) may be prepared by any process known to the skilled person. That is to say, the copolymer (P2) can be prepared from the corresponding polymerisation reaction, i.e. of at least one compound selected from acrylic acid, methacrylic acid, and combinations thereof, and at least one non-ionic compound selected from esters of acrylic acid, esters of methacrylic acid, and combinations thereof, and the subsequent partial or full neutralization of the carboxylic acid functions. Alternatively, the copolymer (P2) is prepared from the polymerisation reaction of the corresponding salt(s) of the at least one compound selected from acrylic acid, methacrylic acid, and combinations thereof.

Unless indicated otherwise, the term "partially neutralized" as used herein indicates that the copolymer (P2) still contains unneutralized carboxylic acid functions, i.e. free carboxylic acid functions are present. In contrast thereto, the term "totally neutralized" indicates that any carboxylic acid function present in the copolymer (P2) is neutralized, i.e. no free carboxylic acid functions are present. The methods of partially or totally replacing protons of carboxylic acid functions by monovalent cations are well known as well as the methods to determine whether a polymer is partially or totally neutralized.

In one embodiment, the carboxylic acid functions of the copolymer (P2) are totally or partially neutralized in an amount of at least 85 mol-%, preferably in an amount of at least 90 mol-%. In one embodiment, the carboxylic acid functions of the copolymer (P2) are totally neutralized, i.e. the carboxylic acid functions of the copolymer (P2) are neutralized in an amount of 100 mol-%. In this embodiment, the copolymer (P2) does not contain free carboxylic acid functions.

Accordingly, the carboxylic acid functions of the copolymer (P2) are preferably totally or partially neutralized by $Na^+$, $K^+$, $Li^+$ or combinations thereof in an amount from 85 to 100 mol-%. More preferably, the carboxylic acid functions of the copolymer (P2) are totally or partially neutralized by $Na^+$, $K^+$, $Li^+$ or combinations thereof in an amount from 90 to 100 mol-%. For example, the carboxylic acid functions of the copolymer (P2) are totally or partially neutralized in an amount of at least 85 mol-%, preferably at least 90 mol-%. If not otherwise indicated the amount of $Na^+$, $K^+$, $Li^+$ or combinations thereof is based on the total amount of carboxylic acid functions in the copolymer (P2).

For example, the carboxylic acid functions of the copolymer (P2) are partially neutralized in an amount from 85 to 95 mol-%. In this embodiment, the copolymer (P2) thus contains free carboxylic acid functions in an amount from 5 to 15 mol-%. Preferably, the carboxylic acid functions of the copolymer (P2) are partially neutralized in an amount from 88 to 92 mol-%, i.e. the copolymer (P2) contains free carboxylic acid functions in an amount from 8 to 12 mol-%.

Alternatively, the carboxylic acid functions of the copolymer (P2) are totally neutralized, e.g. in an amount of 100 mol-%. In this embodiment, the copolymer (P2) does not contain free carboxylic acid functions.

Preferably, the carboxylic acid functions of the copolymer (P2) are totally neutralized.

In another embodiment, the carboxylic acid functions of the copolymer (P2) are totally or partially neutralized by $Na^+$ only. That is to say, the carboxylic acid functions are totally or partially neutralized by $Na^+$ in an amount of at least 85 mol-%, i.e. from 85 to 100 mol-%, more preferably at least 90 mol-%, i.e. from 90 to 100 mol-%, still more preferably 100 mol-%.

For example, the carboxylic acid functions of the copolymer (P2) are partially neutralized by $Na^+$ in an amount from 85 to 95 mol-%. In this embodiment, the copolymer (P2) thus contains free carboxylic acid functions in an amount from 5 to 15 mol-%. Preferably, the carboxylic acid functions of the copolymer (P2) are partially neutralized by $Na^+$ in an amount from 88 to 92 mol-%, i.e. the copolymer (P2) contains free carboxylic acid functions in an amount from 8 to 12 mol-%.

Alternatively, the carboxylic acid functions of the copolymer (P2) are totally neutralized by $Na^+$, e.g. in an amount of 100 mol-%. In this embodiment, the copolymer (P2) does not contain free carboxylic acid functions.

Additionally, it has been found out that the molecular weight of the at least one copolymer (P2) must be in a very specific range. Most advantageously, the copolymer (P2) has an average molecular weight (Mw) as measured by gel permeation chromatography (GPC) from 4 000 to 20 000 g/mol.

According to one embodiment, the at least one copolymer (P2) provided in step c) has an average molecular weight (Mw) as measured by gel permeation chromatography (GPC) from 4 000 to 18 000 g/mol, preferably from 10 000 to 16 000 g/mol.

Additionally, it is required that the polydispersity Index (PI) of the at least one copolymer (P2) must be in a very specific range. Most advantageously, the copolymer (P2) has a polydispersity Index (PI) as measured by gel permeation chromatography (GPC) of between 1.5 and 4.0.

Preferably, the copolymer (P2) provided in step c) has a polydispersity Index (PI) as measured by gel permeation chromatography (GPC) of between 1.5 and 3.8, preferably between 1.6 and 3.7, more preferably between 1.7 and 3.5, and most preferably between 1.8 and 3.3.

In one embodiment, the copolymer (P2) provided in step c) is thus a copolymer, wherein 100% of the neutralized carboxylic acid functions of the copolymer are neutralized by $Na^+$ and having
  i) a molecular weight (Mw) as measured by gel permeation chromatography (GPC) from 4 000 to 20 000 g/mol, preferably from 4 000 to 18 000 g/mol, more preferably from 4 000 to 16 000 g/mol, and
  ii) a polydispersity Index (PI) as measured by gel permeation chromatography (GPC) of between 1.5 and 4.0, preferably between 1.7 and 3.9.

The amount of the at least one grinding aid polymer provided in step c) may be adjusted to the specific needs. If not otherwise indicated, the amount of the at least one grinding aid polymer is based on the total dry weight of the calcium carbonate-comprising material provided in step b). According to the present invention, the amount of said at least one grinding aid polymer provided in step c) preferably ranges from 0.05 to 0.5 wt.-%, based on the total dry weight of the calcium carbonate-comprising material. For example, the amount of said at least one grinding aid polymer provided in step c) preferably ranges from 0.08 to 0.4 wt.-%, more preferably from 0.1 to 0.3 wt.-%, and most preferably from 0.12 to 0.2 wt.-%, based on the total dry weight of the calcium carbonate-comprising material.

Unless specifically stated otherwise, the amount of the at least one grinding aid polymer is to be understood as a total amount. In cases where said at least one grinding aid polymer is added in one portion, the indicated amount thus refers to the amount of said one portion. Accordingly, in cases where the at least one grinding aid polymer is added in more than one portion, the indicated amount thus refers to the total amount of said portions. Further, in cases where a mixture of a homopolymer (P1) and a copolymer (P2) is provided as the at least one polymer in step c), the amount of the at least one grinding aid polymer is to be understood as the sum of the total amount of the homopolymer (P1) and the total amount of the copolymer (P2).

Process Step d)

According to step d) of the process according to the present invention, an aqueous suspension is formed by mixing the water of step a), the at least one calcium carbonate-comprising material of step b) and the at least one grinding aid polymer of step c).

In this respect, it is possible to obtain the aqueous suspension to be formed in step d) of the process according to the present invention by contacting with each other the components provided in steps a) to c) in any order.

According to one embodiment, the aqueous suspension to be formed in step d) is obtained by simultaneously mixing the water of step a), the at least one calcium carbonate-comprising material of step b) and the at least one grinding aid polymer of step c).

According to another embodiment, the aqueous suspension to be formed in step d) is obtained by mixing first the water of step a) with the at least one calcium carbonate-comprising material of step b) and then adding the at least one grinding aid polymer of step c) into the mixture.

According to still another embodiment, the aqueous suspension to be formed in step d) is obtained by mixing first the water of step a) with the at least one grinding aid polymer of step c) and then adding the at least one calcium carbonate-comprising material of step b) into the mixture.

According to a further embodiment, the aqueous suspension to be formed in step d) is obtained by mixing first the at least one grinding aid polymer of step c) with the at least one calcium carbonate-comprising material of step b) and then adding the water of step a) into the mixture.

It is preferred that the aqueous suspension to be formed in step d) is obtained by
  i. mixing simultaneously the water of step a), the at least one calcium carbonate-comprising material of step b) and the at least one grinding aid polymer of step c); or
  ii. mixing first the water of step a) with the at least one calcium carbonate-comprising material of step b) and then adding the at least one grinding aid polymer of step c) into the mixture; or
  iii. mixing first the water of step a) with the at least one grinding aid polymer of step c) and then adding the at least one calcium carbonate-comprising material of step b) into the mixture.

More preferably, the aqueous suspension to be formed in step d) is obtained by
  i. mixing simultaneously the water of step a), the at least one calcium carbonate-comprising material of step b) and the at least one grinding aid polymer of step c); or
  ii. mixing first the water of step a) with the at least one calcium carbonate-comprising material of step b) and then adding the at least one grinding aid polymer of step c) into the mixture.

The aqueous suspension of step d) may have any solids content that is suitable to be subjected to a wet grinding. However, in order to avoid excessive up-concentration and dewatering steps following the wet grinding, it is advantageous that the aqueous suspension formed in step d) has a relatively high solids content. Thus, it is preferred that the aqueous suspension formed in step d) has a solids content in the range from 40 to 74 wt.-%, more preferably from 50 to 74 wt.-%, most preferably from 50 to 70 wt.-%, based on the total weight of the aqueous suspension.

For the purposes of the process according to the present invention, process step d) is preferably carried out a temperature ranging from 2° C. to 60° C. It is preferred that step d) is carried out at room temperatures, i.e. at 23° C.±3° C.

Process Step e)

According to step e) of the process according to the present invention, the at least one calcium carbonate-comprising material in the aqueous suspension of step d) is wet ground in the presence of the at least one grinding aid polymer in at least one wet grinding step. It is appreciated that an aqueous suspension comprising a ground calcium carbonate-comprising material is obtained.

The term "wet grinding" in the meaning of the process according to the present invention refers to the comminution (e.g., in a ball mill, semi-autogenous mill, or autogenous mill) of solid material (e.g., of mineral origin) in the presence of water meaning that said material is in form of an aqueous slurry or suspension.

For the purposes of the present invention, any suitable mill known in the art may be used. However, said wet grinding step is preferably carried out in a ball mill. It has to be noted that step e) is carried out in at least one wet grinding step, i.e. it is also possible to use a series of grinding units which may, for example, be selected from ball mills, semi-autogenous mills, or autogenous mills.

The process according to the present invention is characterized in that wet grinding step e) is preferably carried out at high solids contents, i.e. at low total water contents, for example at a solids content in the range from 40 to 74 wt.-%, preferably from 50 to 74 wt.-%, and most preferably from 50 to 70 wt.-%, based on the total weight of the aqueous suspension.

Additionally or alternatively, wet grinding step e) is preferably carried out in that the at least one grinding aid polymer of step c) is present in an amount ranging from 0.05 to 0.5 wt.-%, based on the total dry weight of the calcium carbonate-comprising material. For example, wet grinding step e) is carried out in that the at least one grinding aid polymer of step c) is present in an amount ranging from 0.08 to 0.4 wt.-%, more preferably from 0.1 to 0.3 wt.-%, and most preferably from 0.12 to 0.2 wt.-%, based on the total dry weight of the calcium carbonate-comprising material.

It is appreciated that wet grinding step e) can be carried out at room temperature or elevated temperatures. It is for example possible that the temperature of the aqueous suspension when starting step e) is of about room temperature, whereas the temperature may rise until the end of wet grinding step e). That is to say, it is preferred that the temperature during wet grinding step e) is not adjusted to a specific temperature.

Alternatively, the temperature during wet grinding step e) is held at a specific temperature by cooling the aqueous suspension.

For the purposes of the process according to the present invention, wet grinding step e) is preferably carried out at a temperature ranging from 10 to 150° C. According to another embodiment, the temperature in wet grinding step e) ranges from 20 to 100° C., preferably from 20 to 90° C., and most preferably from 20 to 70° C.

It is appreciated that the wet ground calcium carbonate-comprising material obtained after grinding step e) has a weight median particle size $d_{50}$, which is lower than the weight median particle size $d_{50}$ of the calcium-carbonate comprising material provided in step b).

Preferably, the ground calcium carbonate-comprising material in the aqueous suspension obtained in step e) has a weight median particle size $d_{50}$ ranging from 0.1 μm to 3 μm, preferably from 0.1 μm to 2.8 μm, more preferably from 0.4 μm to 2.6 μm, still more preferably from 0.6 μm to 2.5 μm, as determined by the sedimentation method.

Process Step f)

According to step f) of the process according to the present invention, the aqueous suspension obtained in step e) is up-concentrated or partially dewatered to achieve an aqueous suspension comprising a ground calcium-carbonate material in a higher solids content than that of step e) and the solids content achieved in step f is at least 70 wt.-%, based on the total weight of the aqueous suspension.

The up-concentration or partial dewatering step f in the process of the present invention is carried out by means known to the skilled person such as by mechanical- and/or thermal up-concentration or dewatering and/or combinations thereof.

Mechanical up-concentration or partial dewatering can be carried out by centrifugation or by filter pressing. Thermal up-concentration or partial dewatering can be carried out by methods such as solvent evaporation by heat or by flash-cooling.

Preferably, the up-concentration or partial dewatering in step f) is carried out by thermal up-concentration. In one embodiment, the thermal up-concentration is carried out in combination with vacuum.

For the purpose of the present invention, "vacuum" means that the up-concentration or partial dewatering is performed under reduced pressure, i.e. a pressure lower than the standard atmospheric pressure of 1 atm. For example, the up-concentration or partial dewatering is carried out under a pressure from 0.001 mbar to 900 mbar, preferably from 0.1 mbar to 250 mbar, more preferably from 1 mbar to 100 mbar.

In one embodiment, the up-concentration or partial dewatering in step f) is carried out such as to achieve an aqueous suspension having a higher solids content than that of step e) and the solids content achieved in step f) is at least 74 wt.-%, preferably at least 76 wt.-% and most preferably at least 78 wt.-%, based on the total weight of the aqueous suspension. For example, the up-concentration or partial dewatering in step f) is carried out such as to achieve an aqueous suspension having a higher solids content than that of step e) and the solids content achieved in step f is from 70 to 80 wt.-%, preferably from 74 to 80 wt.-%, more preferably from 76 to 80 wt.-%, and most preferably from 78 to 80 wt.-%, based on the total weight of the aqueous suspension.

It is appreciated that the up-concentration or partial dewatering in step f) is carried out without a decrease in particle size of the calcium carbonate-comprising material present in the aqueous suspension. Thus, it is preferred that the ground calcium carbonate-comprising material obtained after the up-concentration or partial dewatering in step f has a weight median particle size $d_{50}$ ranging from 0.1 μm to 3 μm as determined by the sedimentation method.

Preferably, the ground calcium carbonate-comprising material in the aqueous suspension obtained in step f has a weight median particle size $d_{50}$ from 0.1 μm to 2.8 μm, preferably from 0.4 μm to 2.6 μm, more preferably from 0.6 μm to 2.5 μm as determined by the sedimentation method.

In any case, the up-concentration or partial dewatering in step f) is carried out in that the water content in the aqueous suspension obtained in step f) is below the water content in the aqueous suspension subjected to step f), i.e. in the aqueous suspension obtained in wet grinding step e). In other words, the up-concentration or partial dewatering in step f) is carried out in that the ground calcium carbonate-comprising material is present in the aqueous suspension obtained in step f) in a solids content higher than the solids content of the ground calcium carbonate-comprising material in the aqueous suspension subjected to step f), i.e. in the aqueous suspension obtained in wet grinding step e).

It is appreciated that the up-concentration or partial dewatering in step f) is carried out separate from the wet-grinding in step e). Preferably, the up-concentration or partial dewatering in step f) is carried out after the wet-grinding in step e). More preferably, the up-concentration or partial dewatering in step f) is carried out after the wet-grinding in step e) has been completed. Thus, the up-concentration or partial dewatering in step f) is preferably carried out separate from and subsequent to the wet-grinding in step e).

Optional Process Steps

It is appreciated that the aqueous suspension comprising a ground calcium carbonate-comprising material in a solids content of at least 70 wt.-%, based on the total weight of the suspension, as obtained by the process as described hereinabove, may be subject to further processing steps, if desired. For example, the aqueous suspension obtained in step f may be subject to a drying step g) to achieve a ground calcium carbonate-comprising material having a moisture content of less than or equal to 0.5 wt.-%, based on the total dry weight of the calcium carbonate-comprising material. It may further be desirable to subject the ground calcium carbonate-comprising material having a moisture content of less than or equal to 0.5 wt.-%, as obtained in step g), to a surface treating step h) with at least one hydrophobizing agent, in order to obtain a hydrophobized calcium carbonate-comprising material having a moisture content of less than or equal to 0.5 wt.-%.

In general, the drying step may be carried out by any drying method known to the skilled person. For example, optional drying step g) can be carried out through drying means selected from the group comprising atomizing, spray drying, drying in a rotational oven, drying in a pond, jet-drying, fluid bed drying, freeze drying, fluidized spray drying, or fountain nozzle drying.

It is appreciated that optional drying step g) may be carried out without a decrease in particle size of the calcium carbonate-comprising material.

In any case, the optional drying in step g) is carried out in that the moisture (or water) content in the material obtained in step g) is below the water content in the aqueous suspension subjected to step g), i.e. in the aqueous suspension obtained after the up-concentration or partial dewatering in step f).

It is appreciated that the optional drying in step g) is carried out separate from the up-concentration or partial dewatering in step f). Preferably, the optional drying in step g) is carried out after the up-concentration or partial dewatering in step f. More preferably, the optional drying in step g) is carried out after the up-concentration or partial dewatering in step f) has been completed. Thus, the optional drying in step g) is preferably carried out separate from and subsequent to the up-concentration or partial dewatering in step f).

According to optional step h), the calcium carbonate-comprising material obtained in step g) may be further surface treated with at least one hydrophobizing agent.

By means of such hydrophobizing step, a treatment layer is formed on at least a part of the surface of the dried calcium carbonate-comprising material obtained in step g).

The hydrophobizing agent used in optional hydrophobizing step h) may be any agent known to the skilled person which is capable to form a hydrophobic treatment layer on at least part of the surface of a calcium carbonate-comprising material.

For example, the hydrophobizing agent of optional step h) may be selected from the group consisting of aliphatic carboxylic acids having a total amount of carbon atoms from 4 to 24 chain carbon atoms, mono-substituted succinic anhydrides, phosphoric acid ester blends, polyhydrogenosiloxanes, aliphatic aldehydes having 6 to 14 carbon atoms, and mixtures thereof.

Optional process step h) results in a surface treated calcium carbonate-comprising material.

It is appreciated that the surface treated calcium carbonate-comprising material obtained in optional process step h) of the present invention further comprises reaction products of the hydrophobizing agent used.

The term "reaction products" in the meaning of the present invention refers to products obtained by contacting the surface of the calcium carbonate-comprising material with the at least one hydrophobizing agent. Said reaction products are formed between the applied at least one hydrophobizing agent and reactive molecules located at the surface of the calcium carbonate-comprising material. The surface treatment of a calcium carbonate-comprising material is well known to the skilled person. Thus, the skilled person is also well aware of the reaction products that may be formed by such a reaction such that there is no need to define the reaction products that may be formed on the surface of the calcium carbonate-comprising material in more detail in the present application.

In some cases, the optional hydrophobizing step h) may be carried out directly at the end of the optional drying step g).

Also the surface treated calcium carbonate-comprising material obtained after optional hydrophobizing step h) has a low total moisture content.

Articles and Uses

The inventors surprisingly found that according to the process of the present invention, a homopolymer (P1) and/or a copolymer (P2) can be used as grinding aid polymer in a process for obtaining an aqueous suspension comprising a ground calcium carbonate-comprising material in a solids content of at least 70 wt.-%, based on the total weight of the suspension, that features a workable viscosity, that is to say a Brookfield viscosity that is lower than that of the same material prepared by a process using a grinding aid agent of the prior art.

In view of this, the present invention refers in another aspect to the use of a homopolymer (P1) and/or a copolymer (P2) in a process for preparing an aqueous suspension comprising a ground calcium carbonate-comprising material in a solids content of at least 70 wt.-%, based on the total weight of the suspension, wherein
  the homopolymer (P1) is prepared from the polymerisation reaction of acrylic acid or methacrylic acid or salts thereof, the homopolymer (P1) having
    an average molecular weight (Mw) as measured by gel permeation chromatography (GPC) from 3 000 to 5 000 g/mol, and
    a polydispersity index (PI) from 1.5 to 2.9 as measured by gel permeation chromatography (GPC), and
    carboxylic acid functions that are totally or partially neutralized
      by $Na^+$ in an amount of 70 mol-% and
      by $Na^+$, $K^+$, $Li^+$ or combinations thereof in an additional amount from 10 to 30 mol-%; and/or
  the copolymer (P2) is prepared from the polymerisation reaction of
    at least one compound selected from acrylic acid, methacrylic acid, salts thereof and combinations thereof, and
    at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof;
  the copolymer (P2) having
    an average molecular weight (Mw) as measured by gel permeation chromatography (GPC) from 4 000 to 20 000 g/mol, and
    a polydispersity index (PI) from 1.5 to 4.0 as measured by gel permeation chromatography (GPC), and
    carboxylic acid functions that are totally or partially neutralized
      by $Na^+$ in an amount of 70 mol-% and
      by $Na^+$, $K^+$, $Li^+$ or combinations thereof in an additional amount from 10 to 30 mol-%.

With regard to the definition of the aqueous suspension, the at least one calcium carbonate-comprising material, the at least one grinding aid polymer and preferred embodiments thereof, reference is made to the comments provided above when discussing process steps a), b), c), d), e) and f).

It is appreciated that the homopolymer (P1) and/or the copolymer (P2) is preferably used in the process of the present invention. That is to say, the homopolymer (P1) and/or the copolymer (P2) is preferably used in the process for preparing an aqueous suspension comprising a ground calcium carbonate-comprising material in a solids content of at least 70 wt.-%, based on the total weight of the suspension, comprising process steps a), b), c), d), e) and f).

The inventors surprisingly found that according to the process of the present invention, an aqueous suspension comprising a calcium carbonate-comprising material in a solids content of at least 70 wt.-%, based on the total weight of the suspension, can be obtained that features a workable viscosity, that is to say a Brookfield viscosity that is lower than that of the same material prepared by a process using a grinding aid agent of the prior art.

In view of this, the present invention refers in yet another aspect to an aqueous suspension comprising a ground calcium carbonate-comprising material in a solids content of at least 70 wt.-%, based on the total weight of the suspension, obtained by the process as defined herein. That is to say, the aqueous suspension comprising a ground calcium carbonate-comprising material in a solids content of at least 70 wt.-%, based on the total weight of the suspension, is obtained by the process for preparing an aqueous suspension comprising a ground calcium carbonate-comprising material in a solids content at least 70 wt.-%, based on the total weight of the suspension, comprising process steps a), b), c), d), e), and f).

In view of this, the present invention refers in still another aspect to an aqueous suspension comprising water, a ground calcium carbonate-comprising material in a solids content of at least 70 wt.-%, based on the total weight of the suspension, and at least one grinding aid polymer selected from the group consisting of
  a homopolymer (P1) prepared from the polymerisation reaction of acrylic acid or methacrylic acid or salts thereof, the homopolymer (P1) having
    an average molecular weight (Mw) as measured by gel permeation chromatography (GPC) from 3 000 to 5 000 g/mol, and
    a polydispersity index (PI) from 1.5 to 2.9 as measured by gel permeation chromatography (GPC), and
    carboxylic acid functions that are totally or partially neutralized
      by $Na^+$ in an amount of 70 mol-% and
      by $Na^+$, $K^+$, $Li^+$ or combinations thereof in an additional amount of from 10 to 30 mol-%;
  a copolymer (P2) prepared from the polymerisation reaction of
    at least one compound selected from acrylic acid, methacrylic acid, salts thereof and combinations thereof, and
    at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof;
    the copolymer (P2) having
      an average molecular weight (Mw) as measured by gel permeation chromatography (GPC) from 4 000 to 20 000 g/mol, and
      a polydispersity index (PI) from 1.5 to 4.0 as measured by gel permeation chromatography (GPC), and carboxylic acid functions that are totally or partially neutralized
by $Na^+$ in an amount of 70 mol-%, and
by $Na^+$, $K^+$, $Li^+$ or combinations thereof in an additional amount of from 10 to 30 mol-%,
and mixtures thereof.

With regard to the definition of the aqueous suspension comprising a ground calcium carbonate-comprising material in a solids content of at least 70 wt.-%, based on the total weight of the suspension, the at least one grinding aid polymer and preferred embodiments thereof, reference is made to the comments provided above when discussing process steps a), b), c), d), e), and f). In this respect, the aqueous suspension comprising a ground calcium carbonate-comprising material in a solids content of at least 70 wt.-%, based on the total weight of the suspension, preferably has a workable viscosity, that is to say a Brookfield viscosity that is lower than that of the same material prepared by a process using a grinding aid agent of the prior art.

In one embodiment, the process according to the invention results in an aqueous suspension comprising a ground calcium carbonate-comprising material in a solids content of at least 70 wt.-%, based on the total weight of the suspension, having a Brookfield viscosity that is less than 1500 mPa·s, preferably less than 1250 mPa·s, more preferably less than 1000 mPa·s, still more preferably less than 750 mPa·s, and most preferably less than 500 mPa·s, as measured by the use of a RVT model Brookfield™ viscometer at a rotation speed of 100 rpm (revolutions per minute) with the appropriate disc spindle 2, 3 or 4 and a temperature of 25° C.

Preferably according to the invention, the aqueous suspension obtained in step f) has a solids content that is from 74 to 80 wt.-%, while its Brookfield viscosity is less than 1500 mPa·s, preferably less than 1250 mPa·s, more preferably less than 1000 mPa·s, still more preferably less than 750 mPa·s, and most preferably less than 500 mPa·s, as measured by the use of a RVT model Brookfield™ viscometer at a rotation speed of 100 rpm (revolutions per minute) with the appropriate disc spindle 2, 3 or 4 and a temperature of 25° C.

In a further aspect, the present invention relates to the use of the aqueous suspension comprising a ground calcium carbonate-comprising material in a solids content of at least 70 wt.-%, based on the total weight of the suspension, obtained by a process according to the invention or of the aqueous suspension as defined herein above in paper applications such as paper filling and paper coating applications, in coating applications, in paints, in adhesives, in sealants, in concrete, in agriculture applications, in food applications, in cosmetic applications, or in pharmaceutical applications.

In one embodiment, the aqueous suspension comprising a ground calcium carbonate-comprising material in a solids content of at least 70 wt.-%, based on the total weight of the suspension, is used in paper applications such as paper filling and paper coating applications or coating applications.

In another embodiment, the aqueous suspension comprising a ground calcium carbonate-comprising material in a solids content of at least 70 wt.-%, based on the total weight of the suspension, is used in paints, in adhesives or in sealants.

In yet another embodiment, the aqueous suspension comprising a ground calcium carbonate-comprising material in a solids content of at least 70 wt.-%, based on the total weight of the suspension, is used in concrete.

In a further embodiment, the aqueous suspension comprising a ground calcium carbonate-comprising material in a solids content of at least 70 wt.-%, based on the total weight of the suspension, is used in agriculture applications, for example as fertilizer or for plant protection.

In a still further embodiment, the aqueous suspension comprising a ground calcium carbonate-comprising material in a solids content of at least 70 wt.-%, based on the total weight of the suspension, is used in food applications, in cosmetic applications, or in pharmaceutical applications.

The scope and interest of the invention will be better understood based on the following examples which are intended to illustrate certain embodiments of the present invention and are non-limitative.

EXAMPLES

A. Measurement Methods

The following measurement methods are used to evaluate the parameters given in the examples and claims.

pH Measurement

Any pH value was measured at 25° C. (+/−1° C.) using a Mettler-Toledo Seven Easy pH meter and a Mettler-Toledo InLab Expert Pro pH electrode. A three point calibration (according to the segment method) of the instrument was first made using commercially available buffer solutions having pH values of 4, 7 and 10 at 25° C. (from Aldrich). The reported pH values were the endpoint values detected by the instrument (signal differs by less than 0.1 mV from the average over the last 6 seconds).

Conductivity Measurement

Conductivity of a suspension was measured at 25° C. (+/−1° C.) using Mettler Toledo Seven Multi instrumentation equipped with the corresponding Mettler Toledo conductivity expansion unit and a Mettler Toledo InLab 731 conductivity probe, directly following stirring the suspension at 1500 rpm using a Pendraulik tooth disc stirrer. The instrument was first calibrated in the relevant conductivity range using commercially available conductivity calibration solutions from Mettler Toledo. The influence of temperature on conductivity was automatically corrected by the linear correction mode. Measured conductivities were reported for the reference temperature of 20° C. The reported conductivity values were the endpoint values detected by the instrument (the endpoint is when the measured conductivity differs by less than 0.4% from the average over the last 6 seconds).

Particle Size Distribution and Weight Median Grain Diameter

Particle size distribution (mass % particles with a diameter <X) and weight median grain diameter ($d_{50}$) of particulate materials were determined via the sedimentation method, i.e. an analysis of sedimentation behaviour in a gravimetric field. The measurement was made with a Sedigraph™ 5100 at 25° C. (+/−1° C.). The method and the instrument are known to the skilled person and are commonly used to determine grain size of fillers and minerals. The measurement was carried out in an aqueous solution of 0.1% by weight of $Na_4P_2O_7$. The samples were dispersed using a high speed stirrer and ultrasonic.

Viscosity Measurement

Brookfield viscosity was measured after 1 minute (if no other indication) of stirring by the use of a RVT model Brookfield™ viscometer at a rotation speed of 100 rpm (revolutions per minute) with the appropriate disc spindle 2, 3 or 4. Without further indication the viscosity was measured at 25° C. (+/−1° C.).

Weight Solids (% by Weight) of a Material in Suspension

Weight solids was determined by dividing the weight of the solid material by the total weight of the aqueous suspension. The weight of the solid material was determined by weighing the solid material obtained by evaporating the aqueous phase of suspension and drying the obtained material to a constant weight.

Average Molecular Weight (Mw) and Polydispersity Index (PI)

A test portion of the polymer solution corresponding to 90 mg of dry matter was introduced into a 10 ml flask. Mobile phase, with an additional 0.04 wt. % of dimethylformamide, was added, until a total mass of 10 g was reached. The composition of this mobile phase at pH 9 was as follows: $NaHCO_3$: 0.05 mol/l, $NaNO_3$: 0.1 mol/l, triethanolamine: 0.02 mol/l, 0.03 wt. % of $NaN_3$.

The gel permeation chromatography (GPC) equipment was equipped with an isocratic pump of the Waters™ 515 type, the flow rate was set to 0.8 ml/min., a Waters™ 717+ sample changer, a kiln containing a precolumn of the "Guard Column Ultrahydrogel Waters™" type which was 6 cm in length and had an internal diameter of 40 mm, followed by a linear column of the "Ultrahydrogel Waters™" type which was 30 cm in length and had an internal diameter of 7.8 mm.

Detection was accomplished by means of a Waters™ 410 type differential refractometer. The kiln was heated to a temperature of 60° C. and the refractometer was heated to a temperature of 45° C. The GPC equipment was calibrated with a series of powders of sodium polyacrylate standards supplied and certified by Polymer Standard Service or American Polymers Standards Corporation. (maximum ($M_P$) molecular weight of between 900 and $2.25 \cdot 10^6$ g/mol and a polydispersity index of between 1.4 and 1.8).

The calibration graph was of the linear type and took account of the correction obtained using the flow rate marker (dimethylformamide).

Acquisition and processing of the chromatogram were accomplished through use of the PSS WinGPC Scientific v. 4.02 application. The chromatogram obtained was incorporated in the area corresponding to molecular weights higher than 200 g/mol.

B. Materials Used

Calcium Carbonate-Comprising Material A

Natural $CaCO_3$ marble from Italy, Avenza, having a $d_{50}$ value of 50 μm, a $d_{50}$ value of 10 μm, and a $d_{20}$ value of 2 m.

Grinding Aid Agents

The at least one grinding aid polymer used as grinding aid agents are set out in the following table 1.

TABLE 1

| | Grinding aid polymers used | | | |
|---|---|---|---|---|
| Grinding aid polymer | Composition | Mw [g/mol] | PI (Mw/Mn) | Neutralization [mol %] |
| A (comparative) | Homopolymer of acrylic acid | 6 000 | 2.6 | 70% $Na^+$, 30% $Ca^{2+}$ |
| B (inventive) | Homopolymer of acrylic acid | 3 600 | 2.0 | 100% $Na^+$ |
| C (inventive) | Homopolymer of acrylic acid | 3 770 | 2.0 | 90% $Na^+$; 10% carboxylic acid functions |
| D (comparative) | Homopolymer of acrylic acid | 6 000 | 2.6 | 100% $NH_4^+$ |
| E (inventive) | Acrylic acid/ hydroxypropyl acrylate copolymer (74/26 molar) | 14 110 | 3.8 | 100% $Na^+$ |
| F (inventive) | Acrylic acid/ ethyl acrylate copolymer (88/12 molar) | 4 925 | 2.2 | 100% $Na^+$ |
| G (comparative) | Acrylic acid/ hydroxypropyl acrylate copolymer (74/26 molar) | 2 000 | 7.5 | 100% $NH_4^+$ |

C. Test Results

2. Trials 1 to 8

Preparation of Pigment Particles Suspension

An aqueous suspension having solids content of 71 wt.-% (+/−1 wt.-%), based on the total weight of the suspension, was prepared by mixing tap water with 1 500 ppm of the respective grinding aid polymer as set out in tables 2 and 3 and the calcium carbonate-comprising material A using a Ystral mixer (Dispermix, Ystral GmbH, Germany). Subsequently, the obtained mixture was wet ground in a 200-litre vertical attritor mill using zircon silicate beads of 0.6 to 1.0 mm diameter. The slurry temperature at the mill inlet was 20° C. and at the outlet between 50 and 70° C. The mill parameters where adjusted in order to reach a particle size distribution of at least 45%<2 μm.

The results are summarized in tables 2 and 3 below.

TABLE 2

Wet grinding of a calcium carbonate-comprising material suspension with various homopolymers (P1) as grinding aid polymers

| Trial | Grinding aid polymer | Grinding aid polymer quantity [ppm] | Slurry solids [wt.-%] | Slurry Viscosity [mPa·s] | PSD % <2 μm | PSD % <1 μm | $d_{50}$ [μm] | pH |
|---|---|---|---|---|---|---|---|---|
| 1 (comparative) | A | 1 500 | 71.7 | 237 | 46.7 | 27.0 | 2.2 | 9.0 |
| 2 (inventive) | B | 1 500 | 71.7 | 123 | 46.2 | 26.5 | 2.2 | 9.5 |
| 3 (inventive) | C | 1 500 | 71.8 | 88 | 46.0 | 27.0 | 2.3 | 9.3 |
| 4 (comparative) | D | 1 500 | 71.0 | Viscosity too high, not able to grind | N/A | N/A | N/A | N/A |

TABLE 3

Wet grinding of a calcium carbonate-comprising material suspension with various copolymers (P2) as grinding aid polymers

| Trial | Grinding aid polymer | Grinding aid polymer quantity [ppm] | Slurry solids [wt.-%] | Slurry Viscosity [mPa·s] | PSD % <2 μm | PSD % <1 μm | $d_{50}$ [μm] | pH |
|---|---|---|---|---|---|---|---|---|
| 5 (inventive) | E | 1 500 | 71.5 | 310 | 45.6 | 27.1 | 2.3 | 9.3 |
| 6 (inventive) | F | 1 500 | 71.4 | 102 | 47.1 | 28.3 | 2.2 | 9.4 |
| 7 (comparative) | A | 1 500 | 71.5 | 237 | 46.7 | 27.0 | 2.2 | 9.0 |
| 8 (comparative) | G | 1 500 | 71.5 | >1 000 (not possible to grind) | N/A | N/A | N/A | N/A |

In a subsequent stage, the suspensions set out in tables 2 and 3 were up-concentrated using a thermal pilot evaporator from EPCON™ brand. The evaporator was operated at a suspension temperature of 95° C. Samples were taken at different solids concentration and the viscosity was measured after cooling down of the suspension to 25° C. The target was to identify the solids content corresponding to a viscosity (at 25° C.) of approximately 500 mPa·s. The results are shown in tables 4 and 5 below.

TABLE 4 thermal up-concentration - viscosity at different solids concentrations

| Trial | Solids [wt.-%] | Viscosity [mPa·s] at 25° C. |
|---|---|---|
| 2A (inventive) | 74.6 | 320 |
|  | 76.8 | 780 |
| 3A (inventive) | 74.9 | 143 |
|  | 77.2 | 245 |
|  | 78.8 | 510 |

TABLE 5 thermal up-concentration - viscosity at different solids concentrations

| Trial | Solids [wt.-%] | Viscosity [mPa·s] at 25° C. |
|---|---|---|
| 5A (inventive) | 74.9 | 537 |
|  | 77 | 1 170 |
|  | 77.8 | 1 416 |
| 6A (inventive) | 76.3 | 324 |
|  | 77.7 | 558 |
| 7A (comparative) | 76.9 | 3 112 |

From tables 4 and 5, it can be gathered that the viscosity of the aqueous suspensions comprising a ground calcium carbonate-comprising material in a solids content of at least 70 wt.-%, based on the total weight of the suspension, prepared by the inventive process, i.e. by using the at least one grinding aid polymer, is lower compared to a comparative aqueous suspension prepared by a process using the same amount of a grinding aid agent of the prior art. In addition, the grinding aid polymers used according to the invention allow such result where a comparative polymer (see trials 4 and 8; comparatives in tables 2 and 3) even did not allow grinding the mineral material.

The invention claimed is:

1. A process for preparing an aqueous suspension comprising a ground calcium carbonate-comprising material in a solids content of at least 70 wt.-%, based on the total weight of the suspension, the process comprising the steps of
   a) providing water,
   b) providing at least one calcium carbonate-comprising material,
   c) providing at least one grinding aid polymer selected from the group consisting of
      a homopolymer (P1) prepared from the polymerisation reaction of acrylic acid or methacrylic acid or salts thereof, the homopolymer (P1) having
         an average molecular weight (Mw) as measured by gel permeation chromatography (GPC) from 3 000 to 5 000 g/mol, and
         a polydispersity index (PI) from 1.5 to 2.9 as measured by gel permeation chromatography (GPC), and
         carboxylic acid functions that are totally or partially neutralized
            by Na+ in an amount of 70 mol-% and
            by Na+, K+, Li+ or combinations thereof in an additional amount from 10 to 30 mol-%;
      a copolymer (P2) prepared from the polymerization reaction of
         at least one compound selected from acrylic acid, methacrylic acid, salts thereof and combinations thereof, and
         at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof;
      the copolymer (P2) having
         an average molecular weight (Mw) as measured by gel permeation chromatography (GPC) from 4 000 to 20 000 g/mol, and
         a polydispersity index (PI) from 1.5 to 4.0 as measured by gel permeation chromatography (GPC), and carboxylic acid functions that are totally or partially neutralized
            by Na+ in an amount of 70 mol-% and
            by Na+, K+, Li+ or combinations thereof in an additional amount from 10 to 30 mol-%;
      and mixtures thereof,
   d) forming an aqueous suspension by mixing the water of step a), the at least one calcium carbonate-comprising material of step b) and the at least one polymer of step c), e) wet grinding the at least one calcium carbonate-comprising material in the aqueous suspension of step d) in the presence of the at least one polymer in at least one wet grinding step to obtain a ground calcium carbonate-comprising material, and f) up-concentrating or partially dewatering the aqueous suspension comprising the ground calcium carbonate-comprising material obtained in step e) to achieve a higher solids content than that of step e) and the solids content achieved in step f) is at least 70 wt.-%, based on the total weight of the suspension.

2. The process according to claim 1, wherein the aqueous suspension obtained in step f) has a higher solids content than that of step e) and the solids content achieved in step f) is from 70 to 80 wt.-%.

3. The process according to claim 1, wherein the Brookfield viscosity of the aqueous suspension comprising a ground calcium carbonate-comprising material in a solids content of at least 70 wt.-%, based on the total weight of the suspension, is less than 1500 mPa·s, as measured by the use of a RVT model Brookfield™ viscometer at a rotation speed of 100 rpm (revolutions per minute) with the appropriate disc spindle 2, 3 or 4 and a temperature of 25° C.

4. The process according to claim 1, wherein the at least one calcium carbonate-comprising material in the aqueous suspension obtained in step e) and/or f) has a weight median particle size $d_{50}$ from 0.1 to 3.0 µm, determined by the sedimentation method.

5. The process according to claim 1, wherein the aqueous suspension of step d) and/or e) has a solids content from 40 to 74 wt.-%, based on the total weight of the aqueous suspension.

6. The process according to claim 1, wherein the carboxylic acid functions of the homopolymer (P1) or the carboxylic acid functions of the copolymer (P2) are
   totally neutralized; or
   neutralized in an amount of at least 85 mol-%; or
   solely neutralized by Na+.

7. The process according to claim 1, wherein
   the homopolymer (P1) has an average molecular weight (Mw) as measured by gel permeation chromatography (GPC) from 3 100 to 4 900 g/mol; or
   the copolymer (P2) has an average molecular weight (Mw) as measured by gel permeation chromatography (GPC) from 4 000 to 18 000 g/mol.

8. The process according to claim 1, wherein the at least one polymer is present in the aqueous suspension during wet grinding step e) in an amount ranging from 0.05 to 0.5 wt.-%, based on the total dry weight of the calcium carbonate-comprising material.

9. The process according to claim 1, wherein process step f) is carried out by mechanical up-concentration, by thermal up-concentration or by combining mechanical and thermal up-concentration, optionally in combination with vacuum.

10. The process according to claim 1, wherein the aqueous suspension obtained in step f) has a higher solids content than that of step e) and the solids content achieved in step f) is from 78 to 80 wt.-%.

11. An aqueous suspension comprising water, a ground calcium carbonate-comprising material in a solids content of at least 70 wt.-%, based on the total weight of the suspension, and at least one grinding aid polymer selected from the group consisting of
   a homopolymer (P1) prepared from the polymerisation reaction of acrylic acid or methacrylic acid or salts thereof, the homopolymer (P1) having
      an average molecular weight (Mw) as measured by gel permeation chromatography (GPC) from 3 000 to 5 000 g/mol, and
      a polydispersity index (PI) from 1.5 to 2.9 as measured by gel permeation chromatography (GPC), and
      carboxylic acid functions that are totally or partially neutralized
         by Na+ in an amount of 70 mol-% and
         by Na+, K+, Li+ or combinations thereof in an additional amount of from 10 to 30 mol-%;
   a copolymer (P2) prepared from the polymerisation reaction of
      at least one compound selected from acrylic acid, methacrylic acid, salts thereof and combinations thereof, and at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof;

the copolymer (P2) having an average molecular weight (Mw) as measured by gel permeation chromatography (GPC) from 4 000 to 20 000 g/mol, and a polydispersity index (PI) from 1.5 to 4.0 as measured by gel permeation chromatography (GPC), and carboxylic acid functions that are totally or partially neutralized by Na+ in an amount of 70 mol-%, and by Na+, K+, Li+or combinations thereof in an additional amount of from 10 to 30 mol-%;

and mixtures thereof.

12. The process according to claim 1, wherein the Brookfield viscosity of the aqueous suspension comprising a ground calcium carbonate-comprising material in a solids content of at least 70 wt.-%, based on the total weight of the suspension, is less than 500 mPa·s, as measured by the use of a RVT model Brookfield™ viscometer at a rotation speed of 100 rpm (revolutions per minute) with the appropriate disc spindle 2, 3 or 4 and a temperature of 25° C.

13. The process according claim 1, wherein the at least one calcium carbonate-comprising material in the aqueous suspension obtained in step e) and/or f) has a weight median particle size $d_{50}$ from 0.6 to 2.5 μm, determined by the sedimentation method.

14. The process according to claim 1, wherein the aqueous suspension of step d) and/or e) has a solids content from 50 to 70 wt.-%, based on the total weight of the aqueous suspension.

15. The process according to claim 1, wherein the carboxylic acid functions of the homopolymer (P1) or the carboxylic acid functions of the copolymer (P2) are neutralized in an amount of at least 90 mol-%.

16. The process according to claim 1, wherein the carboxylic acid functions of the homopolymer (P1) or the carboxylic acid functions of the copolymer (P2) are solely neutralized by Na+ in an amount of 100 mol-%.

17. The process according to claim 1, wherein the homopolymer (P1) has an average molecular weight (Mw) as measured by gel permeation chromatography (GPC) from 3 200 to 4 800 g/mol.

18. The process according to claim 1, wherein the copolymer (P2) has an average molecular weight (Mw) as measured by gel permeation chromatography (GPC) from 10 000 to 16 000 g/mol.

19. The process according to claim 1, wherein the at least one polymer is present in the aqueous suspension during wet grinding step e) in an amount ranging from 0.12 to 0.2 wt.-%, based on the total dry weight of the calcium carbonate-comprising material.

20. The process according to claim 1, wherein step c) is providing at least one grinding aid polymer comprising a copolymer (P2) prepared from the polymerization reaction of at least one compound selected from acrylic acid, methacrylic acid, salts thereof and combinations thereof, and at least one non-ionic compound selected from hydroxyethylacrylate, hydroxypropylacrylate, hydroxyethylmethacrylate, hydroxypropylmethacrylate, $C_1$-$C_5$ esters of acrylic acid, $C_1$-$C_5$ esters of methacrylic acid, and combinations thereof;

the copolymer (P2) having an average molecular weight (Mw) as measured by gel permeation chromatography (GPC) from 4 000 to 20 000 g/mol, and a polydispersity index (PI) from 1.5 to 4.0 as measured by gel permeation chromatography (GPC), and carboxylic acid functions that are totally or partially neutralized by Na+ in an amount of 70 mol-% and by Na+, K+, Li+ or combinations thereof in an additional amount from 10 to 30 mol-%;

and mixtures thereof.

\* \* \* \* \*